United States Patent
Anzinger et al.

(10) Patent No.: US 7,943,243 B2
(45) Date of Patent: May 17, 2011

(54) INTERFERENCE FIT ASSEMBLY

(75) Inventors: Claus Anzinger, Neutraubling (DE); Willibald Schürz, Pielenhofen (DE); Martin Simmet, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 979 days.

(21) Appl. No.: 11/684,056

(22) Filed: Mar. 9, 2007

(65) Prior Publication Data

US 2007/0231482 A1 Oct. 4, 2007

(30) Foreign Application Priority Data

Mar. 9, 2006 (DE) .................. 10 2006 011 000 U

(51) Int. Cl.
*B32B 15/04* (2006.01)

(52) U.S. Cl. ....................................... 428/680

(58) Field of Classification Search .......... None
See application file for complete search history.

(56) References Cited

U.S. PATENT DOCUMENTS

| | | | | |
|---|---|---|---|---|
| 3,129,502 | A * | 4/1964 | Olson | 228/254 |
| 4,047,658 | A | 9/1977 | Frueauff, Jr. | 228/115 |
| 4,615,171 | A | 10/1986 | Burk | 59/78 |
| 4,687,556 | A | 8/1987 | Sutton et al. | 204/29 |
| 6,257,882 | B1 * | 7/2001 | Wyllie, II | 433/8 |
| 6,454,188 | B1 | 9/2002 | Maier | 239/533.12 |
| 2007/0272769 | A1 * | 11/2007 | Anzinger et al. | 239/403 |

FOREIGN PATENT DOCUMENTS

| | | |
|---|---|---|
| CH | 608078 | 5/1976 |
| DE | 2726107 A1 | 12/1977 |
| DE | 149328 | 7/1981 |
| DE | 221876 | 5/1985 |
| DE | 251426 | 11/1987 |
| DE | 199 27 898 A1 | 12/2000 |
| GB | 1542116 | 3/1979 |

* cited by examiner

*Primary Examiner* — Aaron Austin

(74) *Attorney, Agent, or Firm* — King & Spalding L.L.P.

(57) ABSTRACT

An interference fit assembly (10) is made of a first metal part (12), which has a recess (14) with an inner contact surface (16) and a second metal part (18) arranged in the recess (14) of the first metal part (12), wherein the second metal part has an outer contact surface (20). The inner contact surface (16) of the first metal part is in contact with the outer contact surface (20) of the second metal part (18), and at least one of the contact surfaces (16, 20) features a layer (22), which is made of a material, which differs from the material of the first metal part (12) and the material of the second metal part (18) and which comprises nickel or copper.

5 Claims, 2 Drawing Sheets

INTERFERENCE FIT ASSEMBLY

RELATED APPLICATION

This application claims priority from German Patent Application No. DE 10 2006 011 000.5, which was filed on Mar. 9, 2006, and is incorporated herein by reference in its entirety.

TECHNICAL FIELD

The invention relates to an interference fit assembly

BACKGROUND

The application of pressure onto two metal parts is known, with a fixed connection being established between the two metal parts after pressure has been terminated. A bond established in this manner is referred to as an interference fit assembly.

The unexamined German application DE 27 26 107 A1 thus shows an interference fit assembly made from a first metal part and a second metal part, with the first metal part comprising a recess, in which the second metal part can be accommodated. The pressure exerted on at least one of the metal parts results in a relative movement of the two metal parts on top of one another, thereby finally establishing a fixed connection between the two metal parts.

SUMMARY

The object of the invention is to create an interference fit assembly which can be easily established and ensures a good connection between the metal parts joined in the interference fit assembly.

An interference fit assembly can be made of a first metal part, comprising a recess having an inner contact surface, and a second metal part arranged in the recess of the first metal part, said second metal part having an outer contact surface, wherein the inner contact surface of the first metal part is in contact with the outer contact surface of the second metal part, and at least one of the contact surfaces comprises a layer, which is made of a material, which differs from the material of the first metal part and the material of the second metal part and comprises nickel or copper.

BRIEF DESCRIPTION OF THE DRAWINGS

Exemplary embodiments are described in more detail below with reference to the schematic diagrams, in which.

DETAILED DESCRIPTION

Figure 1:
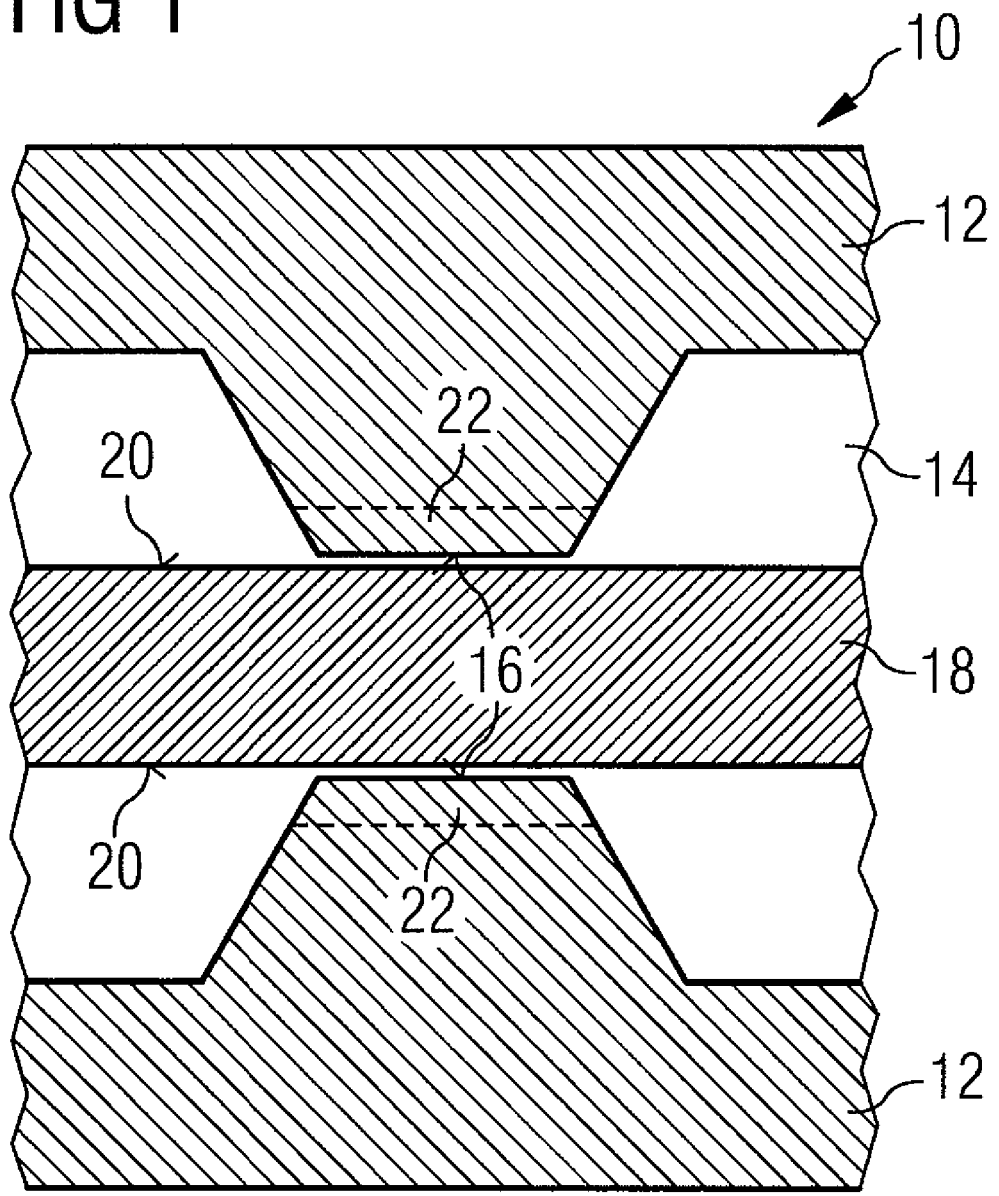
FIG. 1 shows a cross-section through an interference fit assembly.

According to an embodiment, an interference fit assembly can be made of a first metal part comprising a recess with an inner contact surface and a second metal part arranged in the recess of the first metal part, said second metal part comprising an outer contact surface, with the inner contact surface of the first metal part being in contact with the outer contact surface of the second metal part, and at least one of the contact surfaces comprising a layer, which is composed of a material which differs from the material of the first metal part and the material of the second metal part and comprises nickel or copper.

According to an embodiment, the first and second metal part can be made of any type of metal or of any type of metal alloy, which however differs from the material of the layer applied to the corresponding metal part. According to an embodiment, the first and second metal part could be made of the same metal or the same metal alloy or the first and the second metal part could be made of different metals or metal alloys.

This is advantageous since a minimum kinetic friction can be achieved between the first and the second metal part by applying the layer of nickel or copper onto one of the two metal parts prior to forming the interference fit assembly when inserting the second metal part into the recess of the first metal part. This means that the second metal part can be easily inserted into the recess of the first metal part. It is thus possible to avoid removing particles from the first or second metal part. The first and second metal part can then be pressed together in a known manner by applying pressure to at least one of the two metal parts. The interference fit assembly made from a first and a second metal part can thus be established in a simple and precise manner. In particular, an equal and easily reproducible force progression can be achieved by joining the two metal parts. It is also possible to achieve minimal deviations when positioning the two metal parts together.

According to an embodiment, the layer can be composed of chemically applied nickel. Nickel can be chemically applied to metal parts in a simple fashion. This is achieved, according to an embodiment, in that the metal parts are placed in baths with nickel salts, reduction means and other additives, and the nickel can be deposited onto the metal parts. Furthermore, nickel is characterized in that it enables a particularly minimal kinetic friction between the first and the second metal part.

In a further embodiment, one of the metal parts is made of steel. This allows the good sliding attributes between the metal parts also to be applied to steel when a layer of nickel or copper is applied. Furthermore, the layer of nickel on the metal parts made of steel enables the interference fit assembly to exhibit good welding and soldering attributes after the pressing procedure.

In a further embodiment, the layer may have a thickness of one to twenty micrometers. This is advantageous in that it is possible that only one minimal material usage is required for the layer and thus results in minimal costs. Furthermore, it is also possible, as a result of the minimal layer thickness, to exert only a minimal influence on the geometry of high-precision components.

FIG. 1 shows a schematic view of a cross-section through an interference fit assembly 10. The interference fit assembly 10 comprises a first metal part 12 and a second metal part 18. The first metal part 12 has a recess 14, in which the second metal part 18 is arranged. The first metal part 12 has an inner contact surface 16 and the second metal part 18 has an outer contact surface 20. The inner contact surface 16 of the first metal part 12 is in contact with the outer contact surface 20 of the second metal part 18.

The inner contact surface 16 of the first metal part 12 comprises a layer 22. The layer 22 is formed from a material, which differs from the material of the first metal part 12 with the material of the second metal part 18 and is nickel or copper. By applying a layer 22 made of nickel onto one of the two metal parts 12, 18, the slip resistance is significantly reduced between the metal parts 12, 18.

It is particularly advantageous if the layer 22 is applied by means of chemical nickel-plating. A layer applied in this manner can, in particular, be a nickel phosphate layer. This can be applied to the first metal part 12 in a particularly simple fashion.

In an alternative embodiment, instead of the inner contact surface 16 of the first metal part 12, the outer contact surface 20 of the second metal part 18 can also comprise the layer 22. In a further alternative embodiment, both the inner contact surface 16 of the first metal part 12 and also the outer contact surface 20 of the second metal part 18 comprise the layer 22.

The first metal part 12 and the second metal part 18 are preferably made of steel. A layer 22 made of nickel on the first metal part 12 and/or the first metal part 18 made of steel provides for good gliding properties of the corresponding metal part. Furthermore, a layer 22 made of nickel on a metal part made of steel may improve the welding and soldering attributes of the metal part made of steel.

If the second metal part 18 is now introduced into the first metal part 12, the risk of removing particles from the first metal part 12 and/or from the second metal part 18 is reduced as a result of the improved gliding properties between the two metal parts 12, 18, and thereby enables the second metal part 18 to be guided into the first metal part 12 in an efficient manner. The first metal part 12 can then be pressed with the second metal part 18 in a known manner.

If the layer 22 is embodied with a thickness of approximately one to twenty micrometers, only a minimum material usage of nickel and copper is necessary, whereby the cost can be kept to a minimum for the material of layer 22. Furthermore, the minimum layer thickness only exerts a minimal influence on the geometry of the metal parts 12, 18. It is particularly preferable if the thickness of layer 22 amounts to 3-5 μm, since the nickel usage and thus the material costs can, in this way, be kept particularly low.

Figure 2:
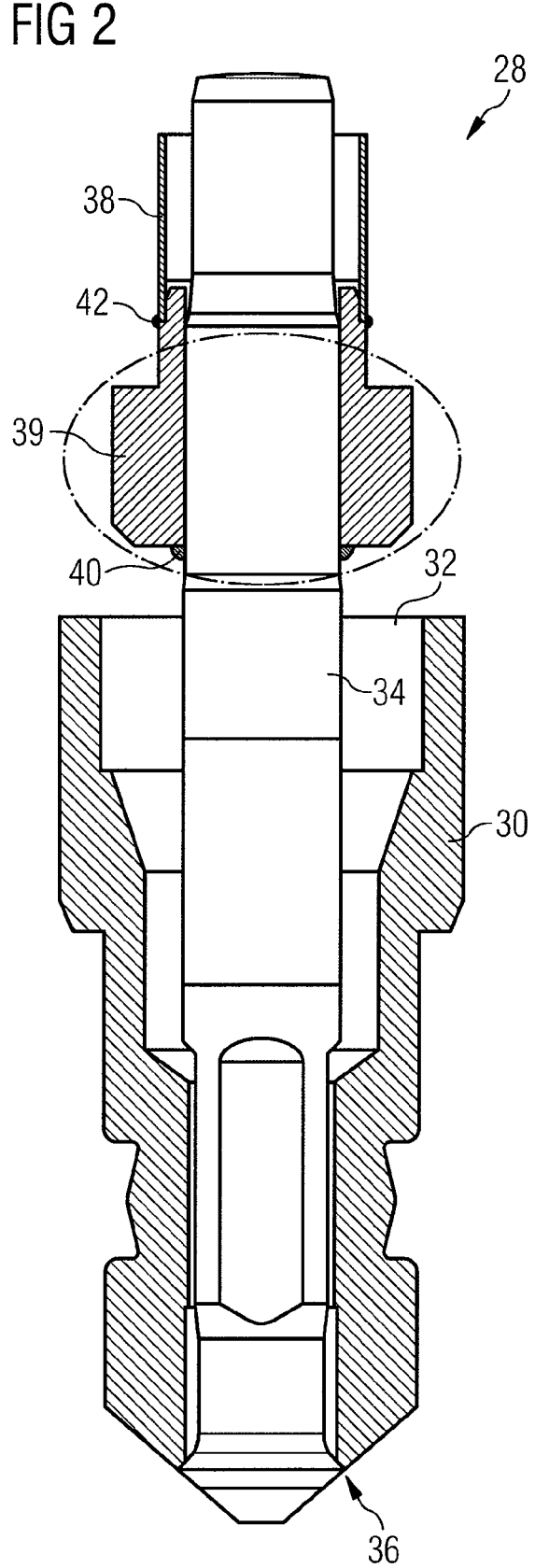
FIG. 2 shows a longitudinal section through an injection valve with an interference fit assembly.

FIG. 2 shows a nozzle assembly 28 of an injection valve. The nozzle assembly 28 comprises a nozzle body 30 having a nozzle body recess 32. A nozzle needle 34 is arranged in the nozzle body recess 32. The nozzle needle 34 is guided regionally in the nozzle body recess 34. An injection port 36 is formed between the nozzle body 30 and the nozzle needle 34 on one axial end of the nozzle body 30 and the nozzle needle 34, with which injection port 36, fuel can be introduced into a combustion chamber of an internal combustion engine of a motor vehicle assigned to the injection valve. The nozzle needle 34 is pretensioned by means of a nozzle spring such that it prevents fluid from flowing through the injection port 36, if no further forces are applied to the nozzle needle 34.

A first ring element 38 and a second ring element 39 are arranged on the end of the nozzle needle 34 facing away from the injection port 36. The first ring element 38 can preferably be configured as part of a sealing element, the second ring element 39 preferably as a nozzle spring supporting element. The first ring element 38 and the second ring element 39 can however alternatively also be other components of the nozzle assembly 28. The second ring element 39 and the nozzle needle 34 form an interference fit assembly. The nozzle needle 34 has an outer contact surface, the second ring element 39 has a recess with an inner contact surface. The nozzle needle 34 and/or the second ring element 39 comprise a layer of nickel on the contact surfaces facing towards the respective other element.

During the production of the interference fit assembly, the second ring element 39 can easily be moved over the nozzle needle 34 with a minimum kinetic friction and can, in a known manner, be designed with the nozzle needle 34 to form an interference fit assembly by exerting a pressure on the second ring element 39. The interference fit assembly from the second ring element 39 and the nozzle needle 34 can be used to achieve a particularly precise positioning of the second ring element 39 compared with the nozzle needle 34.

A first welding seam 40 is designed on the end of the second ring element 39 facing the injection port 36. The first welding seam 40 enables the coupling between the second ring element 39 and the nozzle needle 34 to be improved. A soldered seam can also be configured instead of the first welding seam 40. The layer 22 made of nickel on the nozzle needle 34 or on the second ring element 39 enables the welding and/or soldering properties of the nozzle needle 34 and/or of the second ring element 39 to be improved.

The first ring element 38 is coupled to the second ring element 39 by way of a second welding seam 42. The production of the second welding seam 42 on the second ring element 39 is improved by applying the layer of nickel to the second ring element 39.

What is claimed is:

1. An interference fit assembly comprising:
   a first metal part, comprising a recess having an inner contact surface, and
   a second metal part arranged in the recess of the first metal part, said second metal part having an outer contact surface,
   wherein the inner contact surface of the first metal part is in contact with the outer contact surface of the second metal part, and at least one of the contact surfaces comprises a low-friction layer comprising nickel phosphate, and
   wherein the interference fit assembly is formed by:
   forming the low-friction layer on at least one of the first and second metal parts prior to mating the first and second metal parts,
   after forming the low-friction layer on at least one of the first and second metal parts, inserting the second metal part in the recess of the first metal part, including sliding the inner contact surface of the first metal part relative to the outer contact surface of the second metal part, wherein the low-friction layer formed on at least one of the first and second metal parts provides a lower kinetic sliding friction between the first and second metal parts as compared to a kinetic sliding friction between the first and second metal parts if no low-friction layer is provided.

2. The interference fit assembly according to claim 1, wherein at least one of the metal parts is made of steel.

3. The interference fit assembly according to claim 1, wherein the low-friction layer has a thickness of 1 to 20 micrometers.

4. The interference fit assembly according to claim 1, wherein the low-friction layer has a thickness of 3 to 5 micrometers.

5. The interference fit assembly according to claim 1, wherein the interference fit assembly is further formed by pressing the first and second metal parts together after inserting the second metal part in the recess of the first metal part.

* * * * *